US011258210B1

(12) United States Patent
Penry et al.

(10) Patent No.: US 11,258,210 B1
(45) Date of Patent: Feb. 22, 2022

(54) CABLE HAVING BUILT-IN WEB PORTAL HOSTING CAPABILITY

(71) Applicant: Combat Capabilities Development Command, Chemical Biological Center, Apg, MD (US)

(72) Inventors: Jeremy D Penry, Aberdeen Proving Ground, MD (US); Richard D Wallace, III, Bel Air, MD (US); Jeffrey S Loftus, Sykesville, MD (US)

(73) Assignee: Represented by the Secretary of the Army, Washington, DC (US)

( * ) Notice: Subject to any disclaimer, the term of this patent is extended or adjusted under 35 U.S.C. 154(b) by 427 days.

(21) Appl. No.: 16/567,757

(22) Filed: Sep. 11, 2019

(51) Int. Cl.
| H01R 3/00 | (2006.01) |
| H01R 13/66 | (2006.01) |
| H01R 12/53 | (2011.01) |
| H04L 67/02 | (2022.01) |
| H04L 67/12 | (2022.01) |
| H04L 67/00 | (2022.01) |

(52) U.S. Cl.
CPC ......... *H01R 13/6683* (2013.01); *H01R 12/53* (2013.01); *H01R 13/6691* (2013.01); *H04L 67/02* (2013.01); *H04L 67/12* (2013.01); *H04L 67/34* (2013.01)

(58) Field of Classification Search
None
See application file for complete search history.

(56) References Cited

U.S. PATENT DOCUMENTS

| 10,697,947 B1 * | 6/2020 | Armitage | G08B 21/16 |
| 2013/0307526 A1 * | 11/2013 | Seal | G01R 11/185 |
| | | | 324/105 |
| 2016/0054370 A1 * | 2/2016 | Fomin | G01R 31/52 |
| | | | 324/509 |

* cited by examiner

*Primary Examiner* — Phuoc H Nguyen
(74) *Attorney, Agent, or Firm* — Ulysses John Biffoni

(57) ABSTRACT

A cable system includes a sensor connection segment (SCS), a computer connection segment (CCS), and a radio connection segment (RCS). The SCS includes a printed circuit board assembly (PCBA) and a sensor connection cable for connecting the PCBA to a host sensor system. The PCBA includes hardware and software for providing an embedded web server as part of the cable system. The PCBA can send sensor data over a radio network or receive firmware and calibration updates using the RCS and the CCS, respectively.

20 Claims, 15 Drawing Sheets

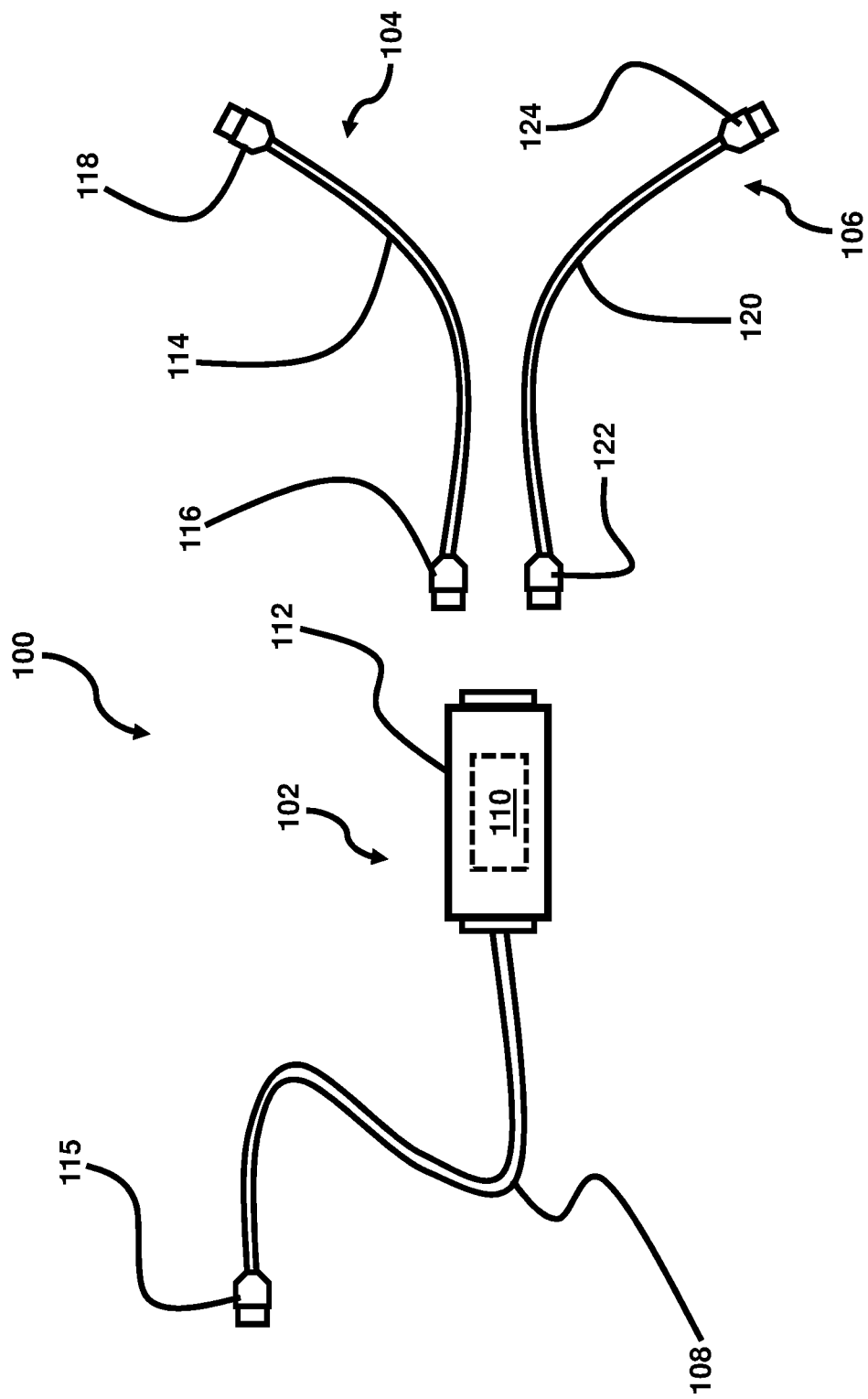

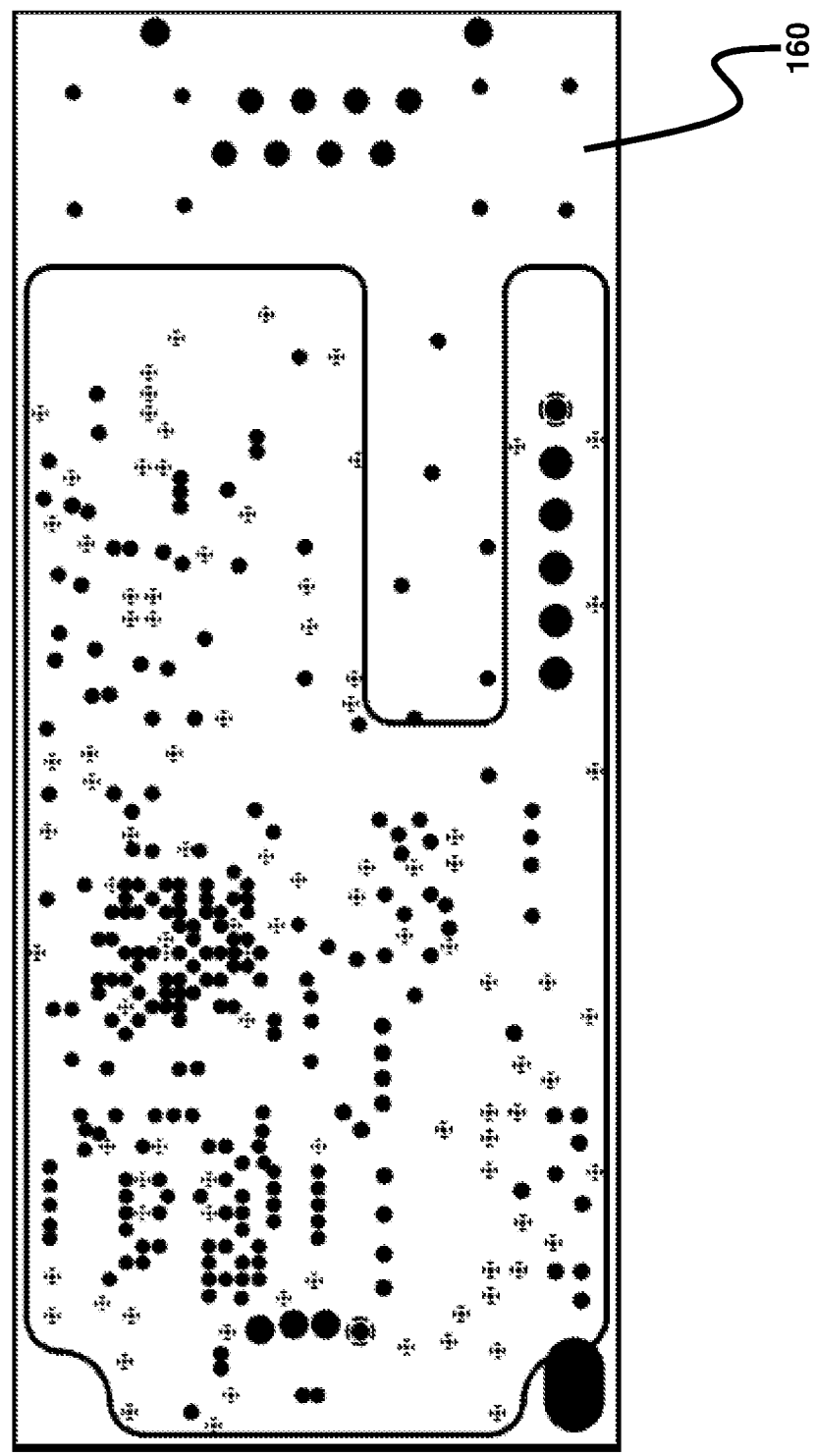

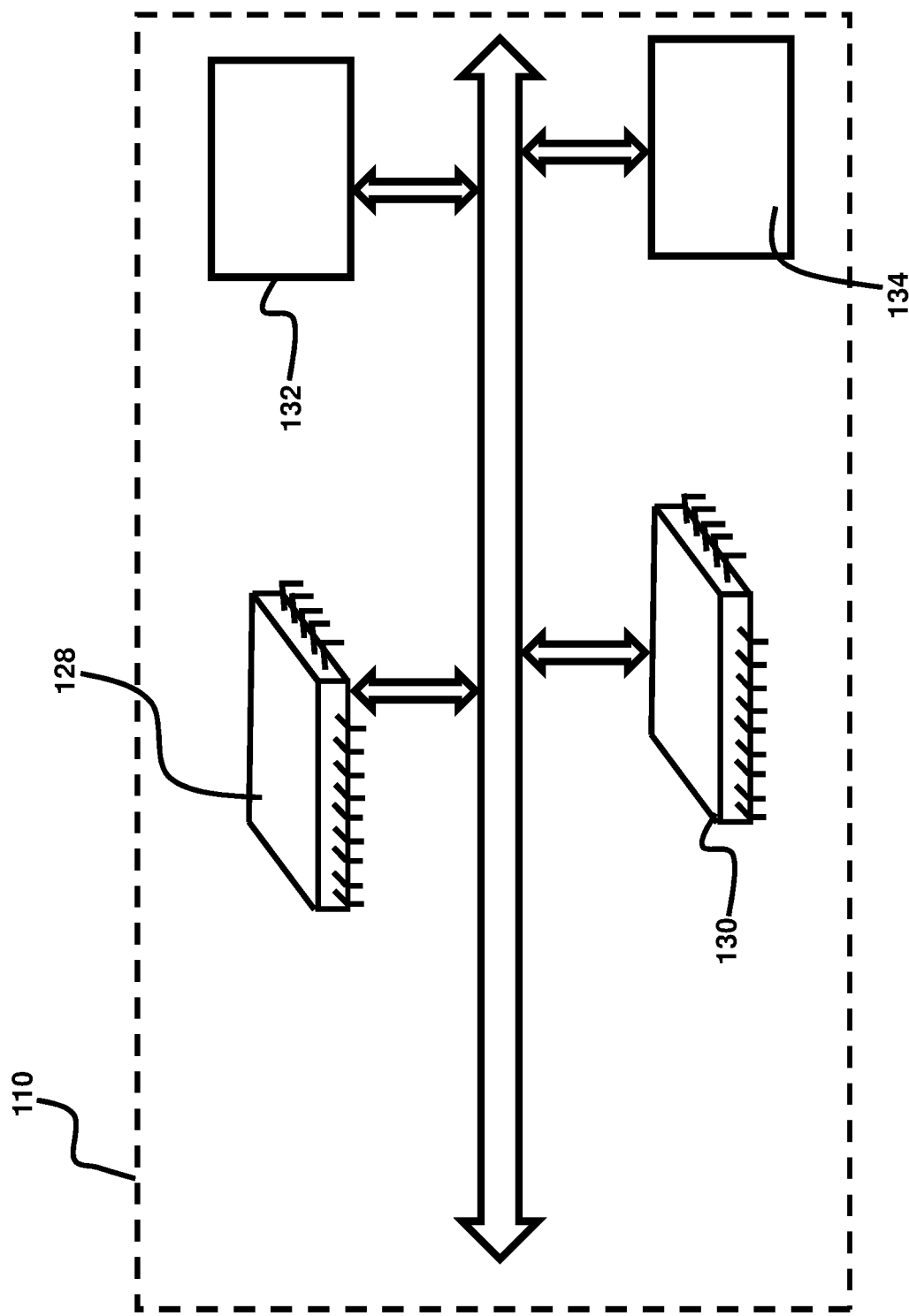

CABLE HAVING BUILT-IN WEB PORTAL HOSTING CAPABILITY

GOVERNMENT INTEREST

The embodiments herein may be manufactured, used, and/or licensed by or for the United States Government.

BACKGROUND

Technical Field

The embodiments herein generally relate to a cable having b web portal hosting capability and method for operating such a cable.

Description of the Related Art

Radiological, biological, and chemical threats loom large on the modern battlefield. Timely warning of such threats can significantly mitigate the damage or harm from such threats to the warfighter. Tactical radio networks of tactical radios worn on each warfighter provide for efficient communication between warfighters and their commanders with the potential to provide warfighters and their commanders with a high level of awareness of the prevailing conditions throughout the battlespace in real time. Sensors have been developed that can detect such threats, for example radiological threats, and that can be carried by the individual soldier. However, heretofore an efficient way of sharing data from such sensors has not been available as such sensors generally lack reliable, embedded telecommunications capability.

Therefore, there is a need to develop an efficient approach for timely sharing of sensor data among warfighters and their commanders to mitigate the harm resulting from radiological, biological, and chemical threats.

SUMMARY

In view of the foregoing, an embodiment herein provides a cable system comprising a sensor connection segment (SCS), a radio connection segment (RCS), and a computer connection segment (CCS). The SCS includes a sensor connection cable (SCC) and a printed circuit board assembly (PCBA). The SCC has a first end and a second end. The first end of the SCC is adapted for communicating with the PCBA and the second end of the SCC is adapted for communicating with a host sensor system. The RCS includes a radio connection cable (RCC) that has a first end and a second end. The first end of the RCC is adapted for communicating with the PCBA and the second end of the RCC is adapted for communicating with a radio. The CCS includes a computer connection cable (CCC) that has a first end and a second end. The first end of the CCC is adapted for communicating with the PCBA and the second end of the CCC is adapted for communicating with a computer. The PCBA is adapted for communicating data from the host sensor system to a destination node in a network through the radio and for facilitating the receipt from the computer of calibration and firmware updates for the host sensor system. Furthermore, the PCBA includes a central processor unit (CPU), memory, communication interfaces for communicating with the SCC and the RCC or the CCC, and software stored in the memory that, when it is executed, causes the PCBA to function as a web server.

In one example, the web server hosts a first web portal to facilitate the passage of data from the host sensor system to the computer, and it hosts a second additional, locally-hosted web portal to facilitate receipt of calibration and firmware updates from the computer for the host sensor system. The embedded web server of the cable system provides for firmware updates to the host sensor system, any connected probes, and the cable system itself. The cable system authenticates the firmware uploaded through the embedded web server of the cable system using a digital signature or hash, and verified using a Cyclic Redundancy Check (CRC) or similar appropriate verification mechanism. Both the authenticity and integrity of all firmware files to be uploaded may be verified using digital signature, hash verification or similar methods.

Another embodiment provides a method for operating a cable system that provides an embedded web server. The method comprises multiple steps. One step is providing a SCS that includes a SCC and a PCBA, the PCBA including a processor, memory, software loaded into the memory, and communication interfaces. Next is the step of connecting the SCC between the PCBA and a host sensor system for communication between the PCBA and the host sensor system. Another step is providing a device connection segment (DCS) that includes a device connection cable (DCC) and first and second connectors each being provided at a corresponding end of the DCC. This is followed by connecting the DCC between the PCBA and a device for allowing communication between the PCBA and the device. The PCBA is operated, through execution of a portion of the software, provide a web server. The services provided by the web server can be used to facilitate receipt of calibration and firmware updates for the host sensor system from the device.

The device may be, for example, a computer, smart phone, mobile phone, tablet, or a tactical or network radio. In another example, the device is a radio and the cable system can be operated to transmit sensor data to a node in the network through the radio.

The cable systems disclosed herein alleviate the need for a host sensor system to provide its own networking functionality. This modular approach allows for future capability enhancements to occur outside of the host sensor to provide their own internal networking functionality. The cable systems disclosed herein will allow sensors without embedded host capabilities to establish connections to select military tactical radio networks. Also, the cable systems disclosed herein will provide a locally-hosted web portal to facilitate the passage of data from the host sensor directly to a computer, and another locally-hosted web portal to facilitate calibration and firmware updates. Accordingly, the cable system disclosed herein solves the pressing technical problem of sharing information from multiple dispersed sensors without networking capability and of upgrading their firmware and calibrating them in the field locally or even remotely.

Without a device such as the cable systems disclosed herein, a system or host sensor is required to provide its own network functionality. This adds burdensome requirements to a system, and limits the functionality of certain systems. The cable systems disclosed herein provides selective communication directionality to isolate the host from unauthorized access.

Calibration and firmware updates will occur only when the host sensor system has been booted into a specialized "listening" mode which will enable two-way communications between a computer and the host sensor system. The associated software will be hosted on the PCBA found in the PCBA Housing (PCBAH). The cable systems disclosed herein comprised three segments. The base for the cable is the SCS that comprises the PCBAH and a length of cable with, for example, a ruggedized USB connector. This cable and connector allows the cable systems disclosed herein to physically connect to the host sensor system. Integrated into the PCBAH housing is a ruggedized network connector allowing data connection.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 2 illustrates an overall view of an embodiment of a cable system having built-in networking capability;

FIGS. 6A through 6F illustrate the layers of conductive traces of the printed circuit board assembly for use with the embodiment of FIG. 4;

FIG. 7 illustrates a schematic view of the printed circuit board assembly for use with the embodiment of FIG. 4;

DETAILED DESCRIPTION

Figure 1A:
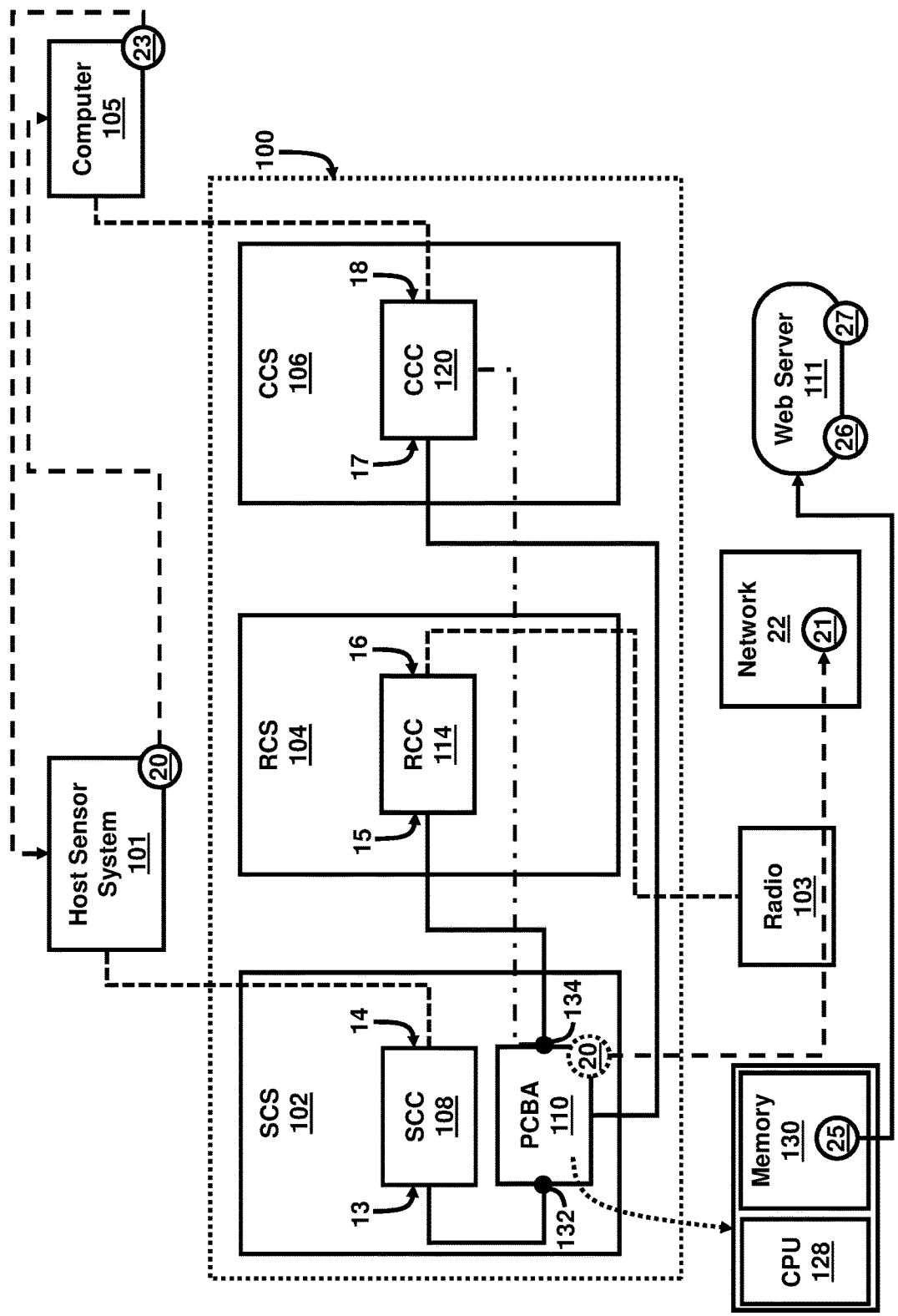
FIG. 1A is a block diagram illustrating a cable system, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1A through 9, where similar reference characters denote corresponding features consistently throughout the figures, there are shown exemplary embodiments. In the drawings, the size and relative sizes of components, layers, and regions, etc. may be exaggerated for clarity. According to FIGS. 1A through 8, some of the embodiments herein are directed to a cable system 100 comprising a sensor connection segment 102 (SCS), a radio connection segment 104 (RCS), and a computer connection segment 106 (CCS). The SCS 102 includes a sensor connection cable 108 (SCC) and a printed circuit board assembly 110 (PCBA). The SCC 108 has a first end 13 and a second end 14. The first end 13 of the SCC 108 is adapted for communicating with the PCBA 110 and the second end 14 of the SCC is adapted for communicating with a host sensor system 101. The RCS 104 includes a radio connection cable 114 (RCC) that has a first end 15 and a second end 16. The first end 15 of the RCC is adapted for communicating with the PCBA 110 and the second end 16 of the RCC is adapted for communicating with a radio 103. The CCS 106 includes a computer connection cable 120 (CCC) that has a first end 17 and a second end 18. The first end 17 of the CCC 120 is adapted for communicating with the PCBA 110 and the second end 18 of the CCC is adapted for communicating with a computer 105. The PCBA 110 is adapted for communicating data 20 from the host sensor system 101 to a destination node 21 in a network 22 through the radio 103 and for facilitating the receipt from the computer 105 of calibration and firmware updates 23 for the host sensor system 101. Furthermore, the PCBA 110 includes a central processor unit 128 (CPU), memory 130, communication interfaces 132, 134 for communicating with the SCC 108 and the RCC 114 or the CCC 120, and software 25 stored in the memory 130 that, when it is executed, causes the PCBA 110 to function as a web server 111.

In some of the embodiments herein, the PCBA 110 functioning as a web server 111 hosts a first web portal 26 to facilitate the passage of data 20 from the host sensor system 101 to the computer 105, and the PCBA 110 (e.g., functioning as a web server 111) hosts a second additional, locally-hosted web portal 27 to facilitate receipt of calibration and firmware updates 23 from the computer 105 for the host sensor system 101.

Figure 1B:
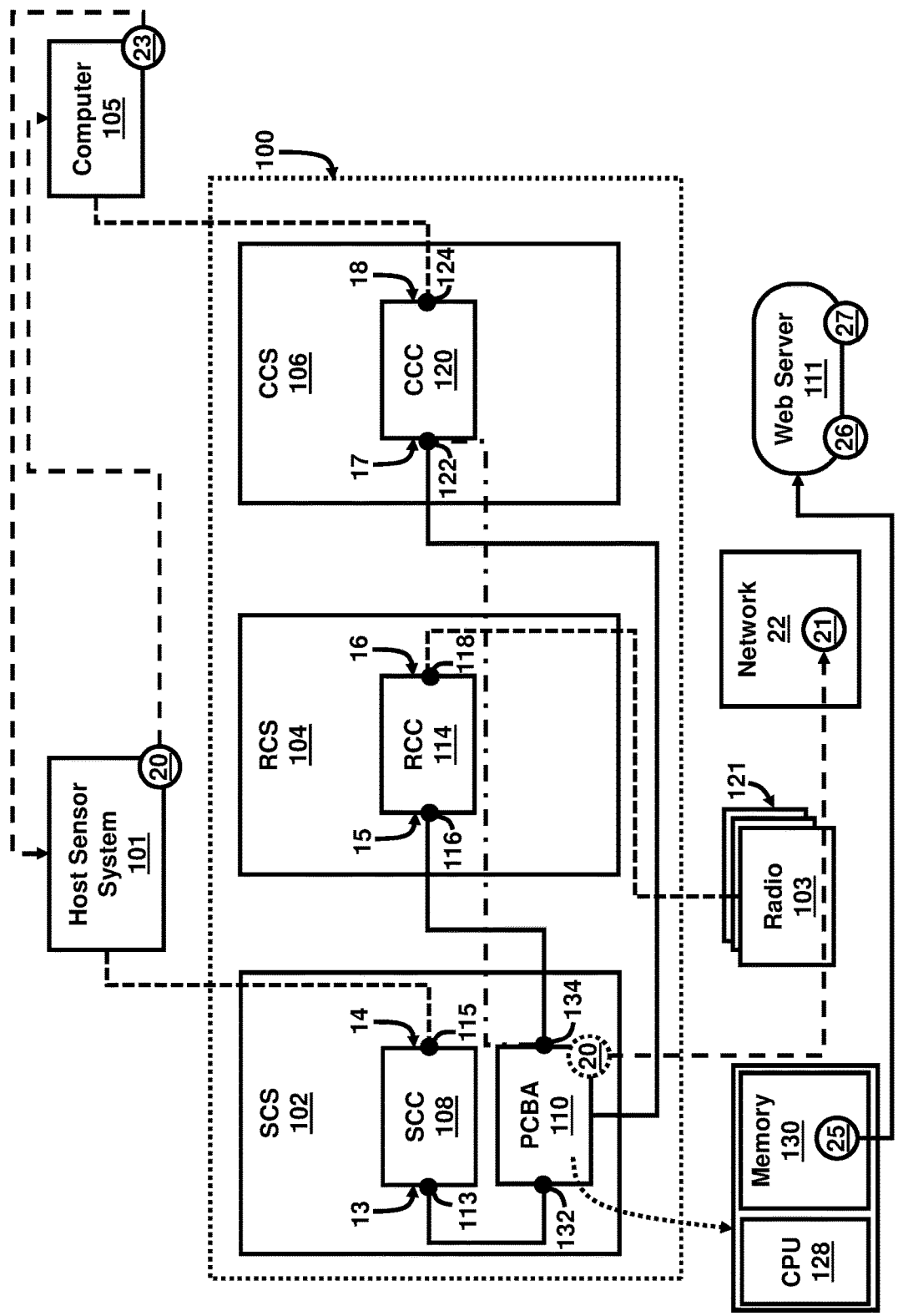
FIG. 1B is a block diagram illustrating a cable system, according to another embodiment herein.

In an embodiment shown in FIG. 1B one of the communication interfaces is a communication port interface 134 adapted for connection to a first CCC connector 122 provided at the first end 17 of the CCC 120. The CCC 120 has a second CCC connector 124 provided at the second end 18 of the CCC for connecting the CCC 120 to the computer 105. The communication port interface 134 is also adapted for connection to a first RCC connector 116 provided at the first end 15 of the RCC 114. The RCC 114 has a second RCC connector 118 provided at the second end 16 of the RCC for connecting the RCC 114 to the radio 103. According to the embodiments herein, the first CCC connector 122 and the first RCC connector 116 are both compatible with the communication port interface 134. The second CCC connector 124 and the second RCC connector 118 may be of different types. In one example, the first CCC connector 122, the first RCC connector 116, and second CCC connector 124 are RJ45 Ethernet connectors, while the second RCC connector 118 may be a Glenae® Mighty Mouse connector. The first end 13 of the SCC 108 comprises a port 113 that is attached to the communication interface 132 of the PCBA 110. The second end 14 of the SCC 108 comprises a port 115 that terminates in a connector 115 for connecting the SCC 108 to the host sensor system 101. In an example, the connector 115 is a ruggedized Universal Serial Bus (USB), 4-pin barrel connector. In an embodiment, the cable system 100 draws its power from the USB input of connector 115 in accordance with On-The-Go and Embedded Host Supplement to the OTG Specification USB Revision 2.0 Specifications. In an example, the cable system power draw is from about 100 mA to about 250 mA. Accordingly, the second end 14 of the SCC 108 is adapted for forming a connection to the host sensor system 101, and the cable system 100 is powered through the SCC 108 by the connection between the SCC 108 and the host sensor system 101. The various connectors and ports described above are further illustrated in the schematic diagram of FIG. 2.

The cable system 100 supports all defined port speeds up to and including full speed in accordance with the On-The-Go and Embedded Host Supplement to the USB Revision 2.0 Specification. Moreover, the hardware of the cable system 100 supports all defined USB device types in accordance with the On-The-Go and Embedded Host Supplement to the USB Revision 2.0 Specification. Although the embodiments herein are not restricted to this specific technical specification.

Figure 3:
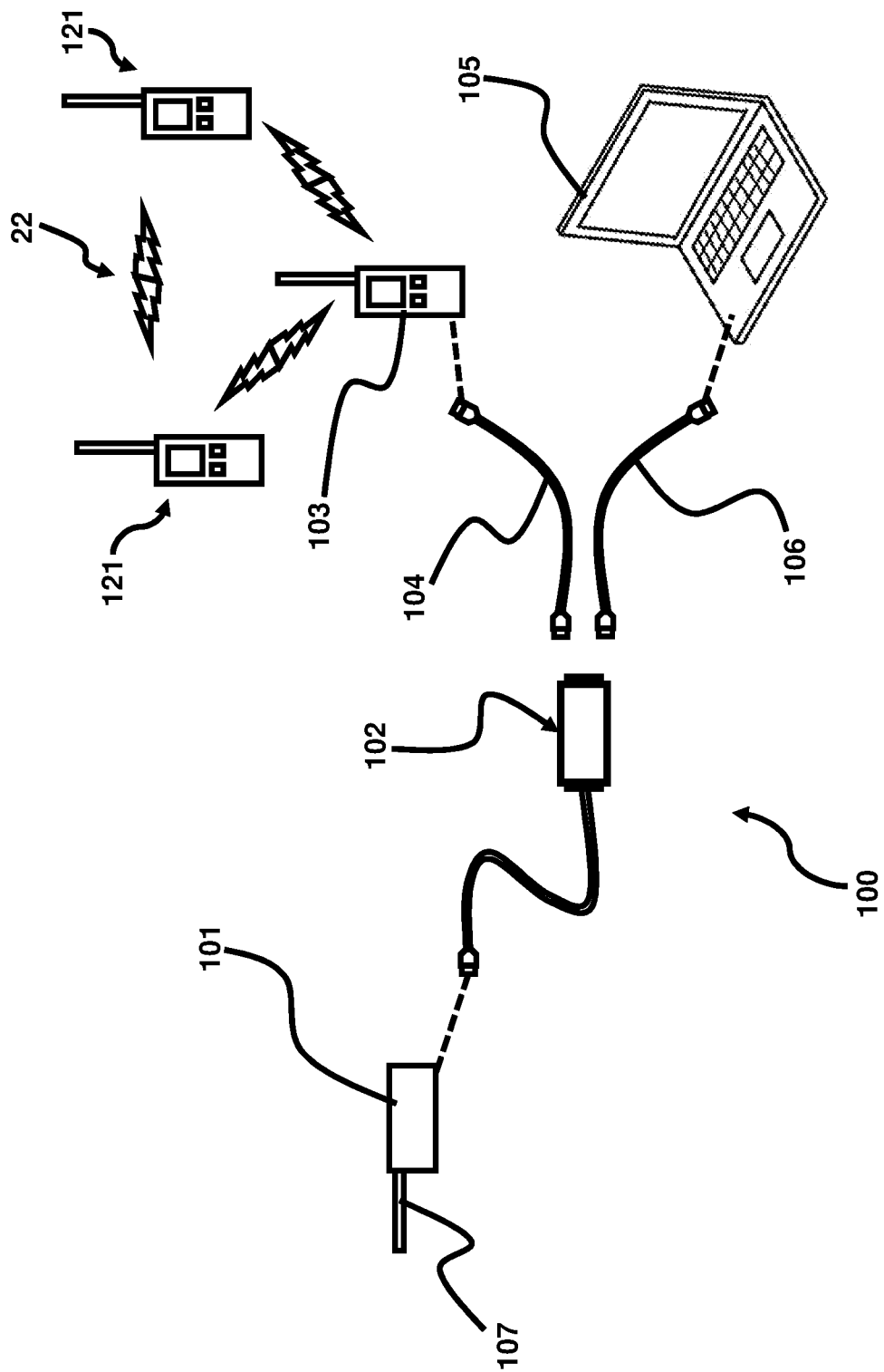
FIG. 3 illustrates a schematic view of the embodiment of the cable system of FIG. 2 in relation to the external devices that work with the cable system.
Figure 4:
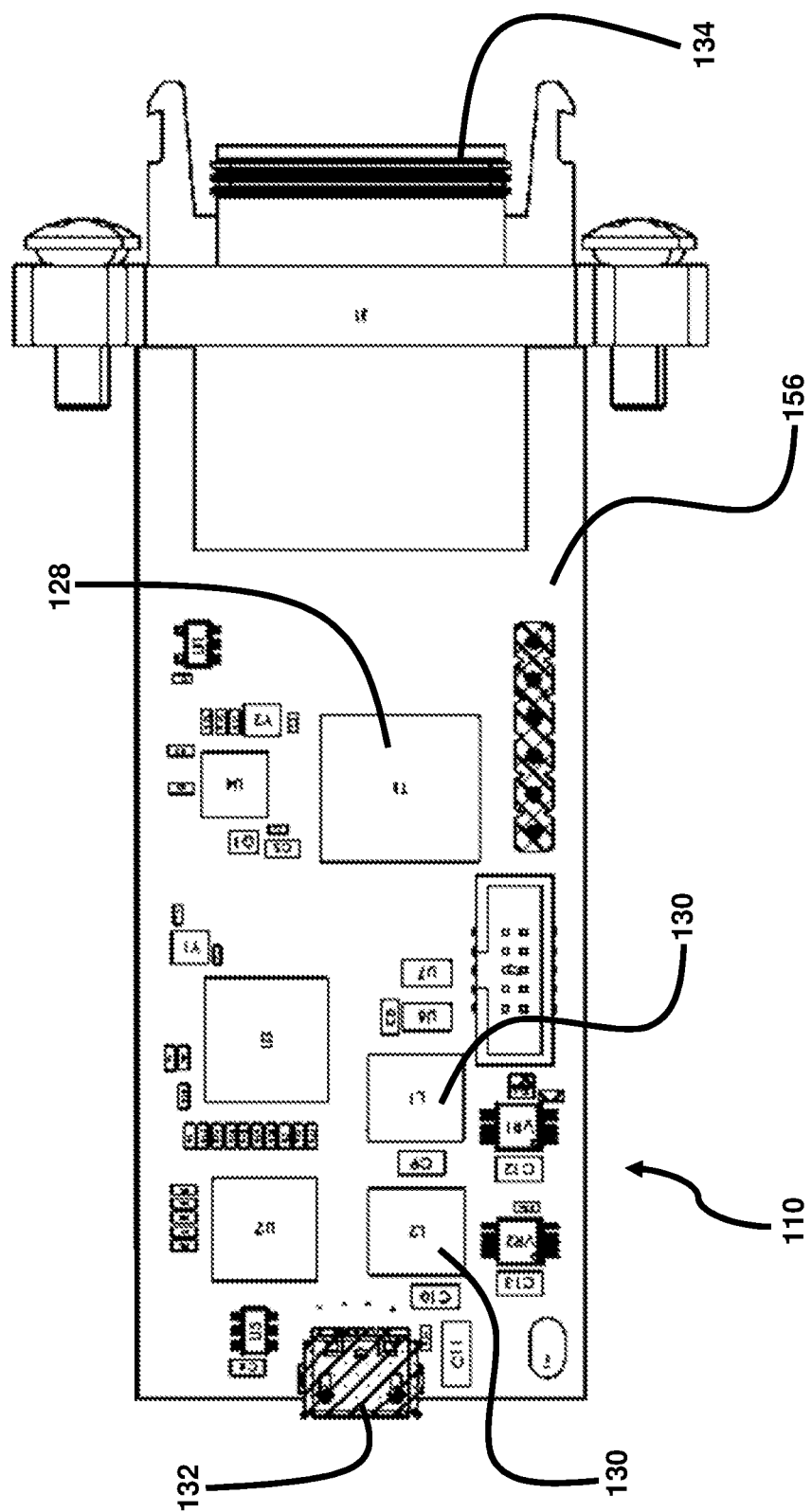
FIG. 4 illustrates a top view of a printed circuit board assembly for use with an embodiment herein.
Figure 5:
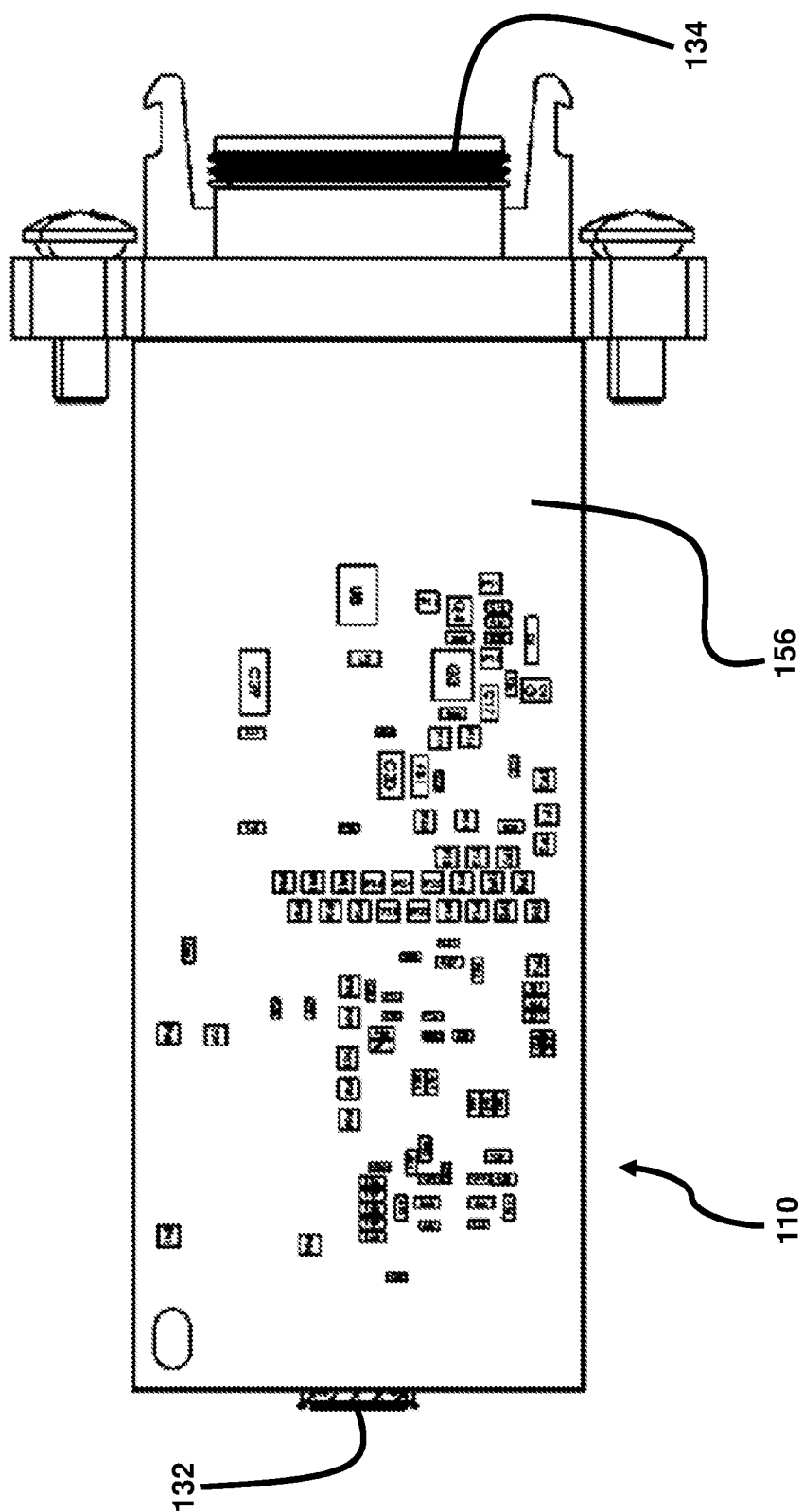
FIG. 5 illustrates a bottom view of a printed circuit board assembly for use with the embodiment of FIG. 4.
Figure 6A:
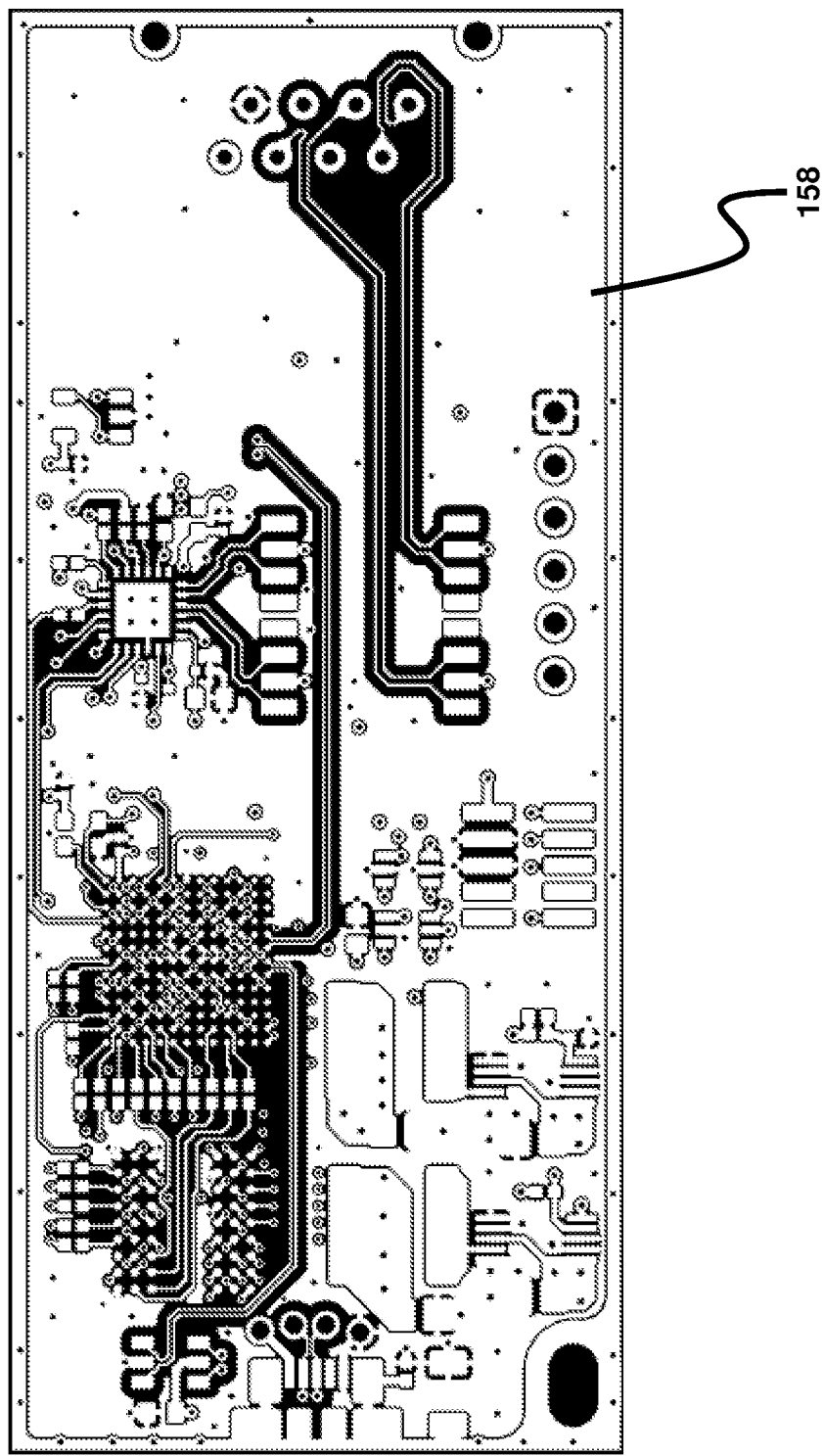
Figure 6C:
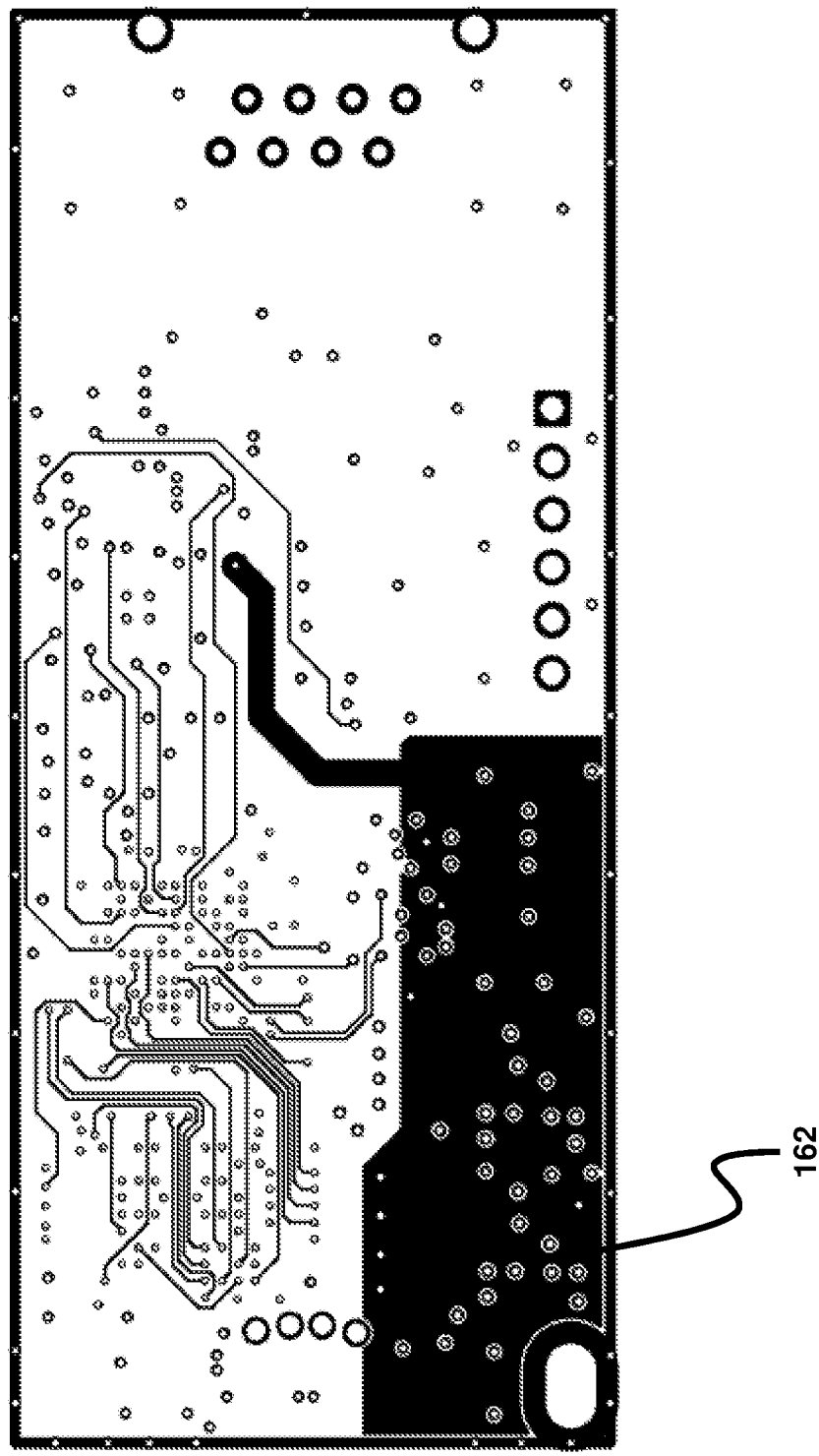
Figure 6D:
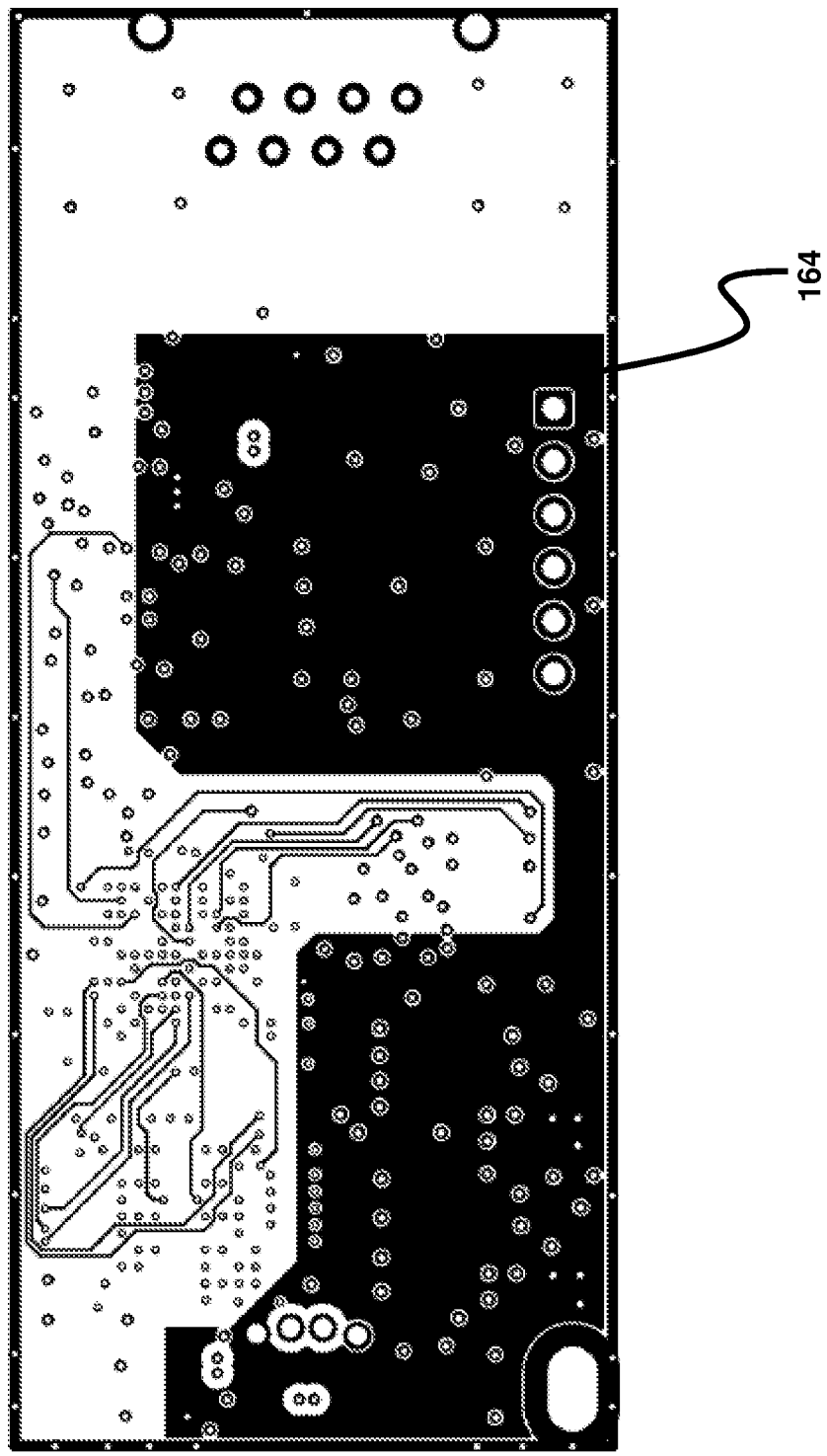
Figure 6E:
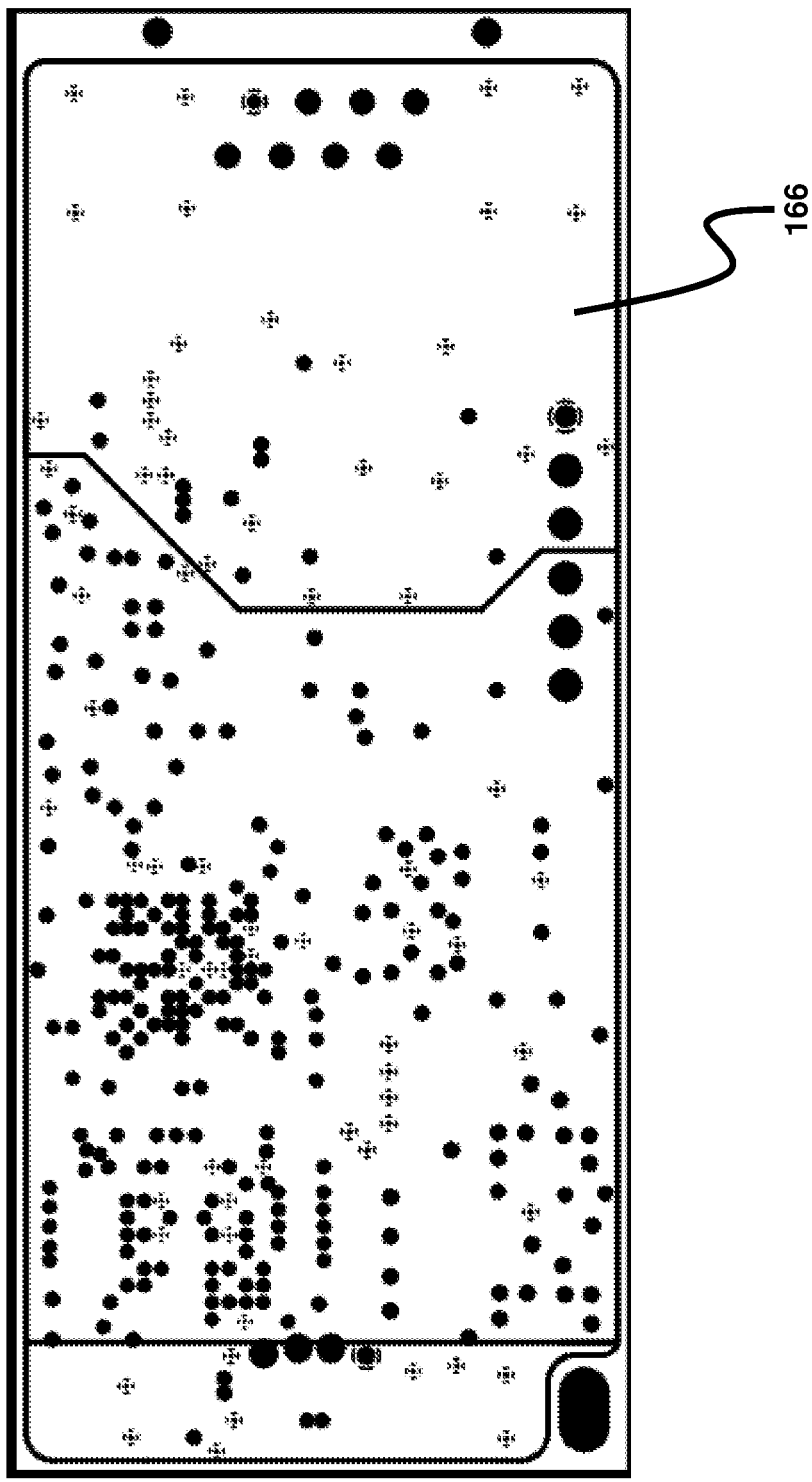
Figure 6F:
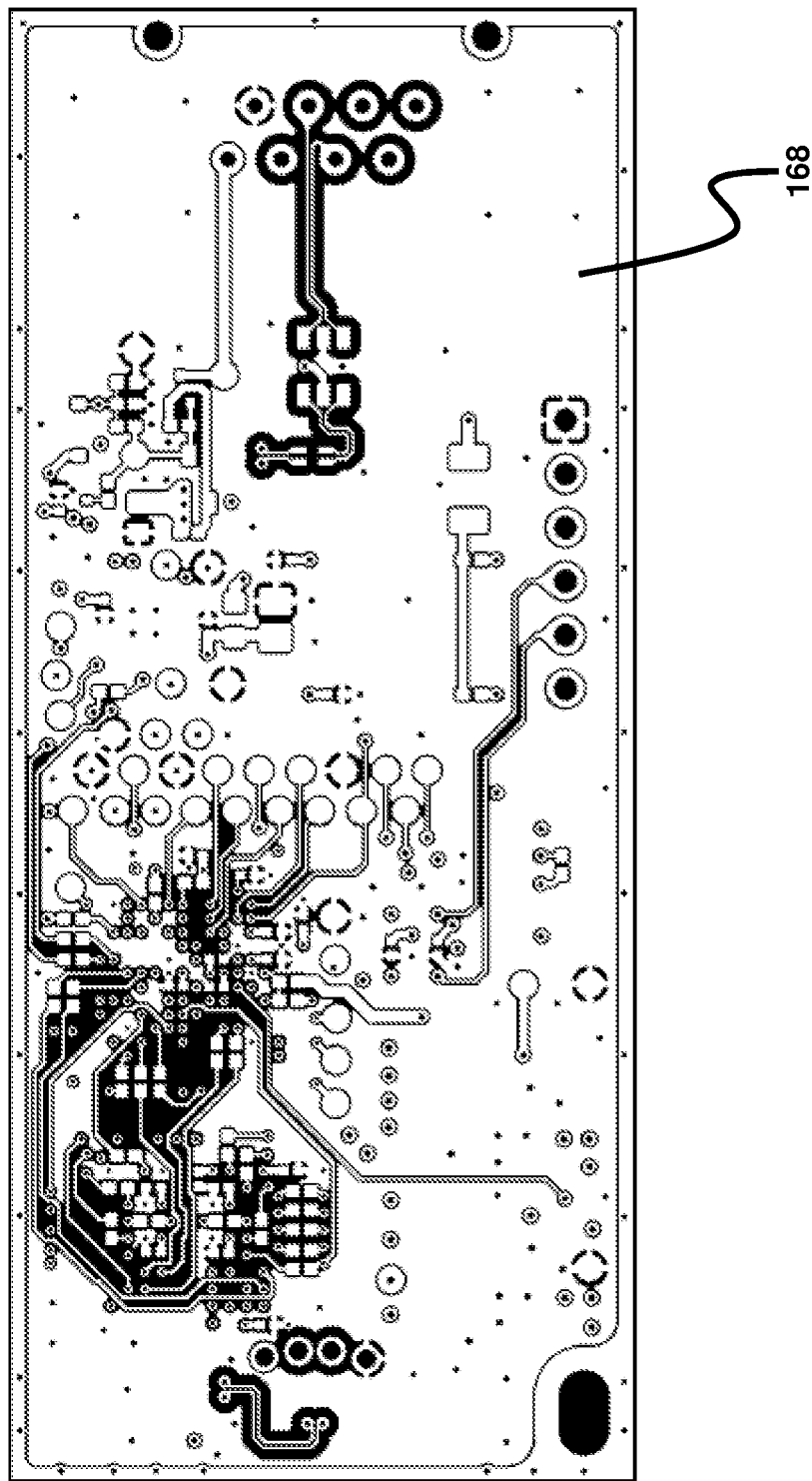

As shown in FIG. 2, the cable system 100 further comprises a printed circuit board assembly housing 112 (PCBAH) for housing and protecting the PCBA 110. The PCBAH 112 is resistant to radiological, chemical or biological contamination. As shown in FIG. 3, in some embodiments herein, the host sensor system 101 includes a detector or probe 107 for detecting the presence of radiological, chemical or biological threats. In the embodiments shown in FIGS. 1B and 3, the radio 103 may be a tactical radio, which may be used in military communications and/or in ruggedized environments. The radio 103 may be part of the network 22 including one or more additional communication or computing devices 121. The tactical radio 103 communicates the data 20 from the host sensor system 101 to one or more other devices 121 in the network 22.

In some embodiments, the data 20 from the host sensor system 101 may be provided in a serial stream. The software 25 embedded in the PCBA 110 causes the cable system 100 to wrap the data 20 in serial stream provided by the host sensor system 101 with a Transmission Control Protocol (TCP) header to facilitate Internet Protocol version 4 (IPv4) transmission of the data 20 from the host sensor system 101 to a device such as, for example, the radio 103, the computer 105, and other devices 121 in the network 22.

In an example, the cable system 100 is configured to be easily carried on a person, and may be configured as a wearable device. In some embodiments, the cable system 100 is adapted for being worn on the user's body without interfering with the normal activities they have to perform in their chosen or assigned role, mission, or occupation. In this regard, in one embodiment, the PCBAH 112 does not exceed about 2.0 inches in width, about 1.0 inch in depth, and about 4.0 inches in length. More specifically, the PCBAH 112 may have a width of about 1.0 inch to about 2.0 inches, a depth of about 0.5 inch to about 1.0 inch, and a length of about 2.0 inches to about 4.0 inches. The cable system 100 may have a weight of no more than about one pound. While the above are provided as exemplary dimensions and weights, the embodiments herein are not limited to these particular dimensions and weights.

The cable system 100 is configured to prevent accidental disconnection of attached components (e.g. SCS 102, RCS 104, or CCS 106) and external equipment during normal use. Users are able to connect the cable system 100 to external systems while wearing gloves such as, for example, arctic trigger-finger mittens. The user is able to perform all functional operations, including maintenance, while wearing Personal Protective Equipment (PPE) or winter/cold weather clothing and accessories. The cable system 100 is of an appropriate length and be sufficiently restrained to prevent snag hazards during normal use, particularly when worn on the user.

In some embodiments, the software 25 of the cable system 100 provides the computer 105 with services including Dynamic Host Configuration Protocol (DHCP) and Domain Name Service (DNS). The DNS service provides resolution for uniform resource locators (URLs) needed for services provided by the web server 111.

Referring to FIGS. 4 through 7, the PCBA 110 includes a printed circuit board (PCB) 156. The PCB 156 has multiple conductive layers, which may be made of copper or other electrically conductive metal, that are separated by insulating layers, which may be made of fiberglass or other fiber reinforced composites that additionally impart structural strength to the PCB 156. The PCB 156 has a first layer 158, a second layer 160, a third layer 162, a fourth layer 164, a fifth layer 166, and a sixth layer 168, according to an embodiment herein. The first layer 158 is a top conductive layer, which is also the first signal layer. The second layer 160 is a ground layer. The third layer 162 is a second signal layer. The fourth layer 164 is the third signal layer. The fifth layer 166 is the $V_{CC}$ layer. The $V_{CC}$ layer is also known as the common collector voltage or the common bias voltage, which powers the circuit. The sixth layer 168 is the bottom layer, which is also the fourth signal layer. The conductive layers shown in FIGS. 6A through 6F are example conductive layers for the PCBA 110 with electrical patterns to form the conductive traces that together with the components, e.g. CPU 128 and memory 130, on the PCB 156, form a complete electrical circuit. Conductively coated holes, known as vias, extend through the PCB 156 and make contact with the required conductive layers, described above, for each via. The conductive layers that are not to make conductive contact with the conductor in the via are etched away from the area surrounding the location of the via. The pins of the circuit components are then conductively connected to the conductor of the corresponding via to form a complete electrical circuit.

The web server 111 provides the capability of hosting a web portal (e.g., first web portal 26) to facilitate the passage of data 20 from the host sensor system 101 to the external device, which may be the computer 105 when the external device is being used to upgrade/update the firmware 23 or calibration data 20. Furthermore, the cable system 100 provides a second additional, locally-hosted web portal 27 that is optimized to facilitate receipt of calibration and firmware updates 23 for the host sensor system 101 from the computer 105.

Alternatively, the external device may be a tactical radio 103 that is part of a network 22 and the PCBA 110 is adapted for communicating data 20 from the host sensor system 101 to a destination node 21 on the network 22 through the tactical radio 103. The PCBA 110 is operated, by the execution of the software 25 in whole or in part, to determine an IP address of the destination node 21, to assign itself an IP address with appropriate attributes to facilitate communication through the network 22 to the IP address of the destination node 21 by routing the data 20 through the tactical radio 103.

Figure 8:
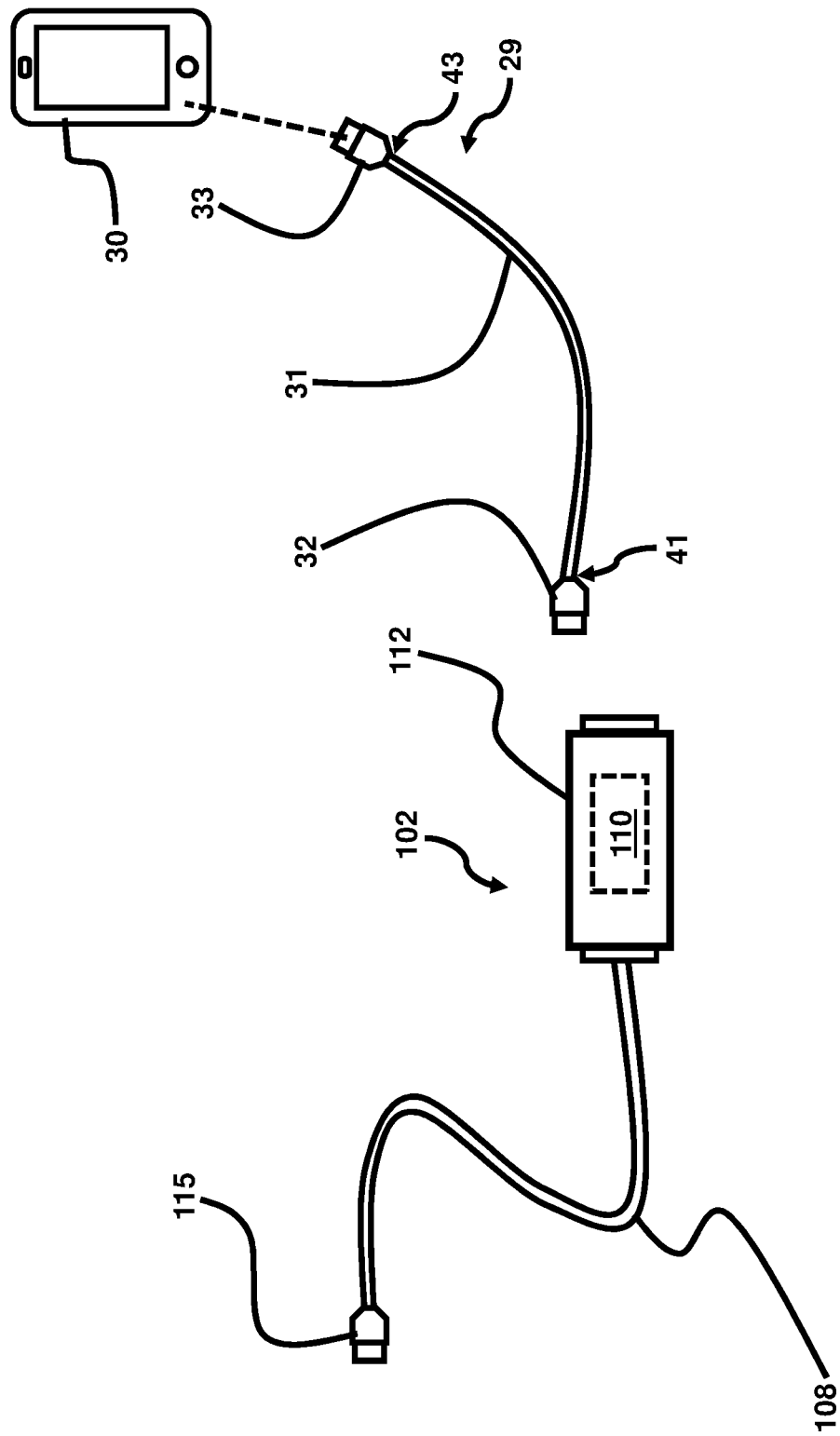
FIG. 8 illustrates a schematic view of the embodiment of the cable system of FIG. 2 in relation to another example of an external device that works with the cable system, according to an embodiment herein.

Referring to FIG. 8, the device 30, as described herein, is defined as any type of communication and/or computing devices, such as the radio 103 and the computer 105. In the exemplary embodiment of FIG. 8, the device 30 is depicted as a smartphone or tablet device. A device connection segment (DCS) 29, as described herein, is defined as the connection segment linked to the device 30. For example, the DCS 29 may broadly represent the RCS 104 (if the device 30 is a radio 103) or the CCS 106 (if the device 30 is a computer 105). A device connection cable (DCC) 31, as described herein, is defined as the connection cable linked to the device 30. The DCS 29 may be broadly defined as any connection mechanism linking the device 30 with the PCBA 110, while the DCC may be the specific example of a cable linking the device 30 with the PC BA 110. For example, the DCC 31 may broadly represent the RCC 114 (if the device 30 is a radio 103) or the CCC 120 (if the device 30 is a computer 105). The DCS 29 comprises a first end 41 and an opposed second end 43. The first end 41 comprises a first connector 32 and the second end 43 comprises a second connector 33. In an example, the first connector 32 may connect to the PCBA 110 contained in the PCBAH 112 and the second connector 33 may connect to the device 30. In an example, the first connector 32 may correspond to the connectors 116, 122 as described above, and the second connector 33 may correspond to the connectors 118, 124 as described above.

Figure 9:
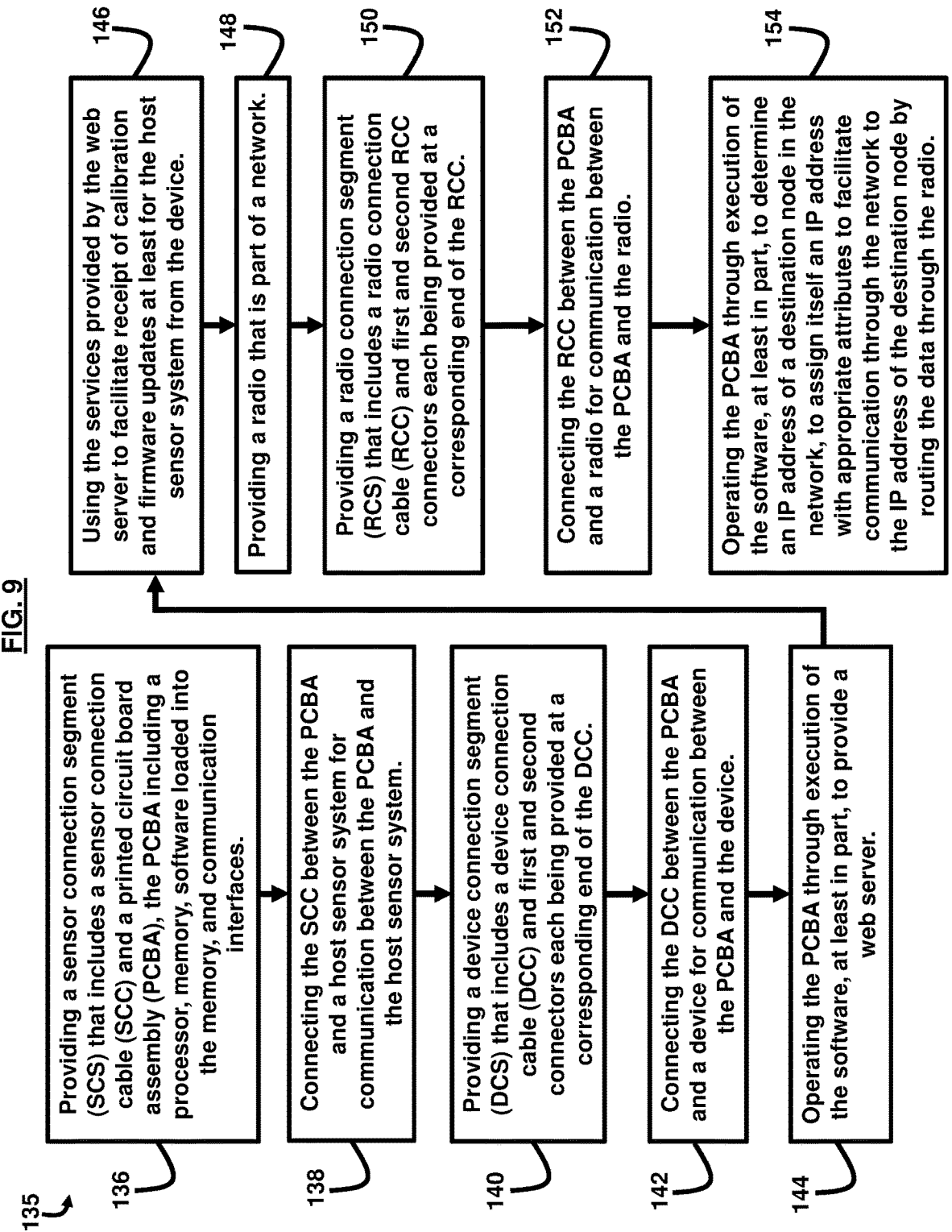
FIG. 9 is a flow diagram illustrating an embodiment of the methods herein for operating a cable system having an embedded networking or web hosting capability.

Referring to FIG. 9, with reference to FIGS. 1A through 8, another embodiment herein provides a method 135 for operating a cable system 100 that provides an embedded web server 111. The method 135 comprises multiple steps. One step is providing (136) a SCS 102 that includes a SCC 108 and a PCBA 110, the PCBA 110 including a processor 128, memory 130, software 25 loaded into the memory 130, and communication interfaces 132, 134. Next is the step of connecting (138) the SCC 108 between the PCBA 110 and a host sensor system 101 for communication between the PCBA 110 and the host sensor system 101. Another step is providing (140) a DCS 29 that includes a DCC 31 and first and second connectors 32, 33 each being provided at a corresponding end (e.g., first end 41 and second end 43) of the DCC 31. This is followed by connecting (142) the DCC 31 between the PCBA 110 and a device 30 (such as the radio 103 or computer 105) for allowing communication between the PCBA 110 and the device 30 (such as the radio 103 or computer 105), Another step is operating (144) the PCBA 110, through execution of a portion of the software 25, to provide a web server 111. Yet another step is using (146) the services provided by the web server 111 to facilitate receipt of calibration and firmware updates 23 for the host sensor system 101 from the device 30 (such as the radio 103 or computer 105).

In some examples, the device connected to the PCBA 110 is a computer 105, the DCS 29 is a CCS 106, and the DCC 31 is a CCC 120. The method 135 may further include the step of providing (148) a radio 103 that is part of a network 22. Another step is providing (150) a RCS 104 that includes a RCC 114 and first and second RCC connectors 116, 118, each being provided at a corresponding end 15, 16, respectively, of the RCC 114. Yet another step is connecting (152) the RCC 114 between the PCBA 110 and the radio 103 for communication between the PCBA 110 and the radio 103. The software 25 includes code that when executed operates (step 154) the PCBA 110 to determine an IP address of a destination node 21 in the network 22, to assign the PCBA 110 itself an IP address with appropriate attributes to facilitate communication through the network 22 to the IP address of the destination node by routing the data 20 of the host sensor system 101 through the radio 103.

In one embodiment herein, the cable system 100 comprises a SCS 102 and a DCS 29. The SCS 102 includes a SCC 108 and a PCBA 110. The SCC 108 has a first end 13 and a second end 14. The first end 13 of the SCC 108 is adapted for communicating with the PCBA 110 and the second end 14 of the SCC 108 is adapted for communicating with a host sensor system 101. The DCS 29 includes a DCC 31 that has a first end 41 and a second end 43. The first connector 32 at the first end 41 of the DCC 31 is adapted for communicating with the PC BA 110 through the PCBAH 112 and the second connector 33 at the second end 43 of the DCC 31 is adapted for communicating with an external device 30 comprising any of a communication device and a computing device (such as the radio 103 or computer 105). Examples of such devices include, without limitation, computers, laptops, tablets, smart phones, and mobile telephones. The PCBA 110 is adapted for communicating data between the host sensor system 101 and the external device 30.

In an example, the PCBA 110 includes a CPU 128, memory 130, communication interfaces 132, 134 for communicating with the SCC 108 and the DCC 31, and software 25 stored in the memory 130 that when executed causes the PCBA 110 to function as a web server 111. The memory 130 can be of any suitable type including RAM, ROM, DRAM, SRAM, flash drive, solid state drive, EPROM, EEPROM, and optical or magnetic disks or any combination of these. In an example, some amount of the memory 130 is rewritable so that firmware updates 23 can occur.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A cable system comprising:
a sensor connection segment (SCS); and
a device connection segment (DCS),
wherein the SCS includes a sensor connection cable (SCC) and a printed circuit board assembly (PCBA),
wherein the SCC has a first end and a second end, the first end the SCC is adapted for communicating with the PCBA and the second end of the SCC is adapted for communicating with a host sensor system,
wherein the DCS includes a device connection cable (DCC) that has a first end and a second end, the first end the DCC is adapted for communicating with the PCBA and the second end of the DCC is adapted for communicating with an external device comprising any of a communication device and a computing device, and
wherein the PCBA is adapted for communicating data between the host sensor system and the external device.

2. The cable system of claim 1, wherein the PCBA includes a central processor unit (CPU), a memory, communication interfaces for communicating with the SCC and the DCC, and software stored in the memory that when executed causes the PCBA to function as a web server.

3. The cable system of claim 2, wherein the web server hosts a web portal to facilitate the passage of data from the host sensor system to the external device.

4. The cable system of claim 3, wherein the external device is a computer and the cable system provides an additional, locally-hosted web portal to facilitate receipt of calibration and firmware updates for the host sensor system from the computer.

5. The cable system of claim 2, wherein the external device is a tactical radio that is part of a network and the PCBA is adapted for communicating data from the host sensor system to a destination node on the network through the tactical radio.

6. The cable system of claim 5, wherein the PCBA is operated by the execution of the software to determine an IP address of the destination node, and to assign itself an IP address with appropriate attributes to facilitate communication through the network to the IP address of the destination node by routing the data through the tactical radio.

7. The cable system of claim 2, wherein the host sensor system includes a detector for detecting the presence of radiological, chemical, or biological threats, wherein the cable system further comprises a printed circuit board assembly housing (PCBAH) for housing and protecting the PCBA, and wherein the PCBAH is resistant to radiological, chemical, or biological contamination.

8. The cable system of claim 2, wherein one of the communication interfaces is a communication port adapted for connection to a first DCC connector provided at a first end of the DCC, and wherein the DCC has a second DCC connector provided at a second end of the DCC for connecting the DCC to the external device.

9. A cable system comprising:
a sensor connection segment (SCS);
a radio connection segment (RCS); and
a computer connection segment (CCS),
wherein the SCS includes a sensor connection cable (SCC) and a printed circuit board assembly (PCBA),
wherein the SCC has a first end and a second end, the first end of the SCC is adapted for communicating with the PCBA and the second end of the SCC is adapted for communicating with a host sensor system,
wherein the RCS includes a radio connection cable (RCC), the RCC has a first end and a second end, the first end of the RCC is adapted for communicating with the PCBA and the second end of the RCC is adapted for communicating with a radio,
wherein the CCS includes a computer connection cable (CCC), the CCC has a first end and a second end, the first end of the CCC is adapted for communicating with the PCBA and the second end of the CCC is adapted for communicating with a computer,
wherein the PCBA is adapted for communicating data from the host sensor system to a destination node in a network through the radio and for facilitating receipt from the computer of calibration and firmware updates at least for the host sensor system, and
wherein the PCBA includes a central processor unit (CPU), a memory, communication interfaces for communicating with the SCC and the RCC or the CCC, and software stored in the memory that when executed causes the PCBA to function as a web server.

10. The cable system of claim 9, wherein the web server hosts a first web portal to facilitate the passage of data from the host sensor system to the computer, and wherein the cable system provides a second additional, locally-hosted web portal to facilitate receipt of calibration and firmware updates from the computer for the host sensor system.

11. The cable system of claim 10, wherein one of the communication interfaces is a communication port adapted for connection to a first CCC connector provided at a first end of the CCC,
wherein the CCC has a second CCC connector at a second end of the CCC for connecting the CCC to the computer,
wherein the communication port is adapted for connection to a first RCC connector provided at a first end of the RCC,
wherein the RCC has a second RCC connector at a second end of the RCC for connecting the RCC to the radio,
wherein the first CCC connector and the first RCC connector are both compatible with the communication port, and
wherein the second CCC connector and the second RCC connector are of different types.

12. The cable system of claim 11, wherein the radio is a tactical radio, wherein the tactical radio is part of a network including one or more additional communication or computing devices, and wherein the tactical radio communicates the data from the host sensor system to one or more other devices in the network.

13. The cable system of claim 12, wherein the host sensor system includes a detector or probe for detecting the presence of radiological, chemical, or biological threats, wherein the cable system further comprises a printed circuit board assembly housing (PCBAH) for housing and protecting the PCBA, and wherein the PCBAH is resistant to radiological, chemical, or biological contamination.

14. The cable system of claim 9, wherein the data from the host sensor system is provided in a serial stream, and wherein the software causes the cable system to wrap the serial stream provided by the host sensor system with a Transmission Control Protocol (TCP) header to facilitate Internet Protocol version 4 (IPv4) transmission of the data from the host sensor system to a device comprising any of the radio, the computer, and one or more other devices in the network.

15. The cable system of claim 9, wherein the cable system is adapted for being worn on a user's body.

16. The cable system of claim 9, wherein the second end of the SCC is adapted for forming a connection to the host sensor system and wherein the cable system is powered through the SCC by the connection between the SCC and the host sensor system.

17. The cable system of claim 9, wherein the software of the cable system provides the computer with services including Dynamic Host Configuration Protocol (DHCP) and Domain Name Service (DNS), and wherein the DNS service provides resolution for uniform resource locators (URLs) needed for services provided by the web server.

18. The cable system of claim 14, wherein the computer is part of the same network or another network.

19. A method for operating a cable system that provides an embedded web server, the method comprising:
providing a sensor connection segment (SCS) that includes a sensor connection cable (SCC) and a printed circuit board assembly (PCBA), the PCBA including a processor, a memory, software loaded into the memory, and communication interfaces;
connecting the SCC between the PCBA and a host sensor system for communication between the PCBA and the host sensor system;

providing a device connection segment (DCS) that includes a device connection cable (DCC) and first and second connectors each being provided at a corresponding end of the DCC;

connecting the DCC between the PCBA and a device for communication between the PCBA and the device;

operating the PCBA through execution of the software to provide a web server; and using the services provided by the web server to facilitate receipt of calibration and firmware updates for the host sensor system from the device.

20. The method of claim 19, wherein the device is a computer, the DCS is a computer connection segment (CCS), and the DCC is a computer connection cable (CCC), and wherein the method further comprises:

providing a radio that is part of a network;

providing a radio connection segment (RCS) that includes a radio connection cable (RCC) and first and second RCC connectors each being provided at a corresponding end of the RCC;

connecting the RCC between the PCBA and a radio for communication between the PCBA and the radio; and operating the PCBA through execution of the software to determine an IP address of a destination node in the network, to assign itself an IP address with appropriate attributes to facilitate communication through the network to the IP address of the destination node by routing the data through the radio.

* * * * *